United States Patent
Wu et al.

(10) Patent No.: US 6,902,319 B2
(45) Date of Patent: Jun. 7, 2005

(54) VEHICULAR BATTERY TEMPERATURE ESTIMATION

(75) Inventors: Zhijian James Wu, Rochester Hills, MI (US); Jyh-Laing L. Lin, Novi, MI (US); Dean Marshall, Clarkston, MI (US); Brad Schoeff, Sterling Hts., MI (US); Michel Trumbo, Troy, MI (US); John G Hatfield, Leonard, MI (US); James Karlet, Toledo, OH (US); Yijun Tu, Tecumseh (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/754,062

(22) Filed: Jan. 8, 2004

(65) Prior Publication Data

US 2005/0074048 A1 Apr. 7, 2005

Related U.S. Application Data

(60) Provisional application No. 60/507,997, filed on Oct. 2, 2003.

(51) Int. Cl.$^7$ ............................... H02J 7/14; G01K 3/02
(52) U.S. Cl. ....................... 374/141; 374/152; 320/150; 324/431
(58) Field of Search ................................. 374/141, 144, 374/152, 208, 29, 30, 100, 103, 107; 320/150, 137, FOR 101, 104; 324/431

(56) References Cited

U.S. PATENT DOCUMENTS

| | | | | |
|---|---|---|---|---|
| 5,319,921 A | * | 6/1994 | Gopp | 60/274 |
| 5,680,030 A | * | 10/1997 | Kadouchi et al. | 320/134 |
| 5,711,605 A | * | 1/1998 | Reher et al. | 374/141 |
| 6,076,964 A | | 6/2000 | Wu et al. | |
| 6,417,668 B1 | * | 7/2002 | Howard et al. | 324/426 |
| 6,624,615 B1 | * | 9/2003 | Park | 320/150 |
| 6,711,492 B1 | * | 3/2004 | Pursifull et al. | 701/114 |
| 2002/0070710 A1 | * | 6/2002 | Yagi et al. | 320/150 |
| 2002/0149357 A1 | * | 10/2002 | Morimoto et al. | 324/150 |
| 2003/0080713 A1 | * | 5/2003 | Kirmuss | 320/150 |
| 2003/0080714 A1 | * | 5/2003 | Inoue et al. | 320/150 |
| 2004/0135550 A1 | * | 7/2004 | Nishihata et al. | 320/150 |
| 2004/0189254 A1 | * | 9/2004 | Kapsokavathis et al. | 320/132 |
| 2004/0199324 A1 | * | 10/2004 | Li et al. | 701/114 |
| 2004/0232885 A1 | * | 11/2004 | Sakai et al. | 320/132 |

* cited by examiner

Primary Examiner—Gail Verbitsky
(74) Attorney, Agent, or Firm—Ralph E. Smith

(57) ABSTRACT

A method of estimating an internal temperature of a vehicle battery is based on heat transfer between a heat source and the battery. In addition to the heat source, airflow generated by vehicle movement and radiator fans affects the internal temperature of the battery. The method estimates an initial internal temperature of the battery at engine startup based on how long the engine was off. The temperature of the heat source is determined. A transfer function is determined to represent the effect of the airflow. The method updates a current internal temperature of the battery based on the initial internal temperature and an integration of the transfer function and the heat source temperature.

14 Claims, 2 Drawing Sheets

US 6,902,319 B2

VEHICULAR BATTERY TEMPERATURE ESTIMATION

RELATED APPLICATION(S)

This application claims the benefit of Provisional Patent Application Ser. No. 60/507,997, filed Oct. 2, 2003.

FIELD OF THE INVENTION

The present invention relates to determining the internal temperature of a battery, and more particularly to determining the internal temperature of a battery using a dynamic model.

BACKGROUND OF THE INVENTION

A typical internal combustion engine of a vehicle includes a battery that provides power to one or more vehicle electrical systems. When the battery is providing power to one or more of the vehicle electrical systems, the power drain on the battery reduces the battery charge, and thus its voltage output. When the vehicle is running, a vehicle alternator recharges the battery so that the battery charge is high enough for continued power output to the vehicle electrical systems. The greater the power drain on the battery, the more charging is needed for the battery from the alternator. To control the charging output of the alternator, a field control input signal from a controller sets the duty cycle of the alternator depending on the drain on the vehicle battery. This field control of the alternator is referred to as the electronic voltage regulating (EVR) of a vehicle battery charging system.

Battery temperature is an important parameter for providing battery charging control. The temperature of the vehicle battery is required to determine an accurate EVR set point for proper battery charging. A proper set point for the desired battery target voltage will prevent the battery from overheating at high battery temperatures during charging, and prevent the battery from being undercharged at low battery temperatures during charging. For current vehicle technology, a battery temperature sensor, such as a negative temperature coefficient sensor, is mounted outside of the vehicle battery, usually under the battery tray that the battery is mounted on. Because the sensor is mounted outside of the battery, the temperature measurement is severely affected by the surrounding environment, and therefore does not accurately reflect the dynamic variations of the battery's internal temperature. The inability to accurately measure a vehicle battery's temperature adversely affects the recharging of the battery.

SUMMARY OF THE INVENTION

A method of determining an internal temperature of a vehicle battery estimates an initial internal temperature of the battery. A heat source temperature that is indicative of a temperature of an engine block is determined. A transfer function of airflow is determined. An integration function of the transfer function of airflow and the heat source temperature is determined. A current internal temperature of the battery is updated based on the integration function and the initial internal temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
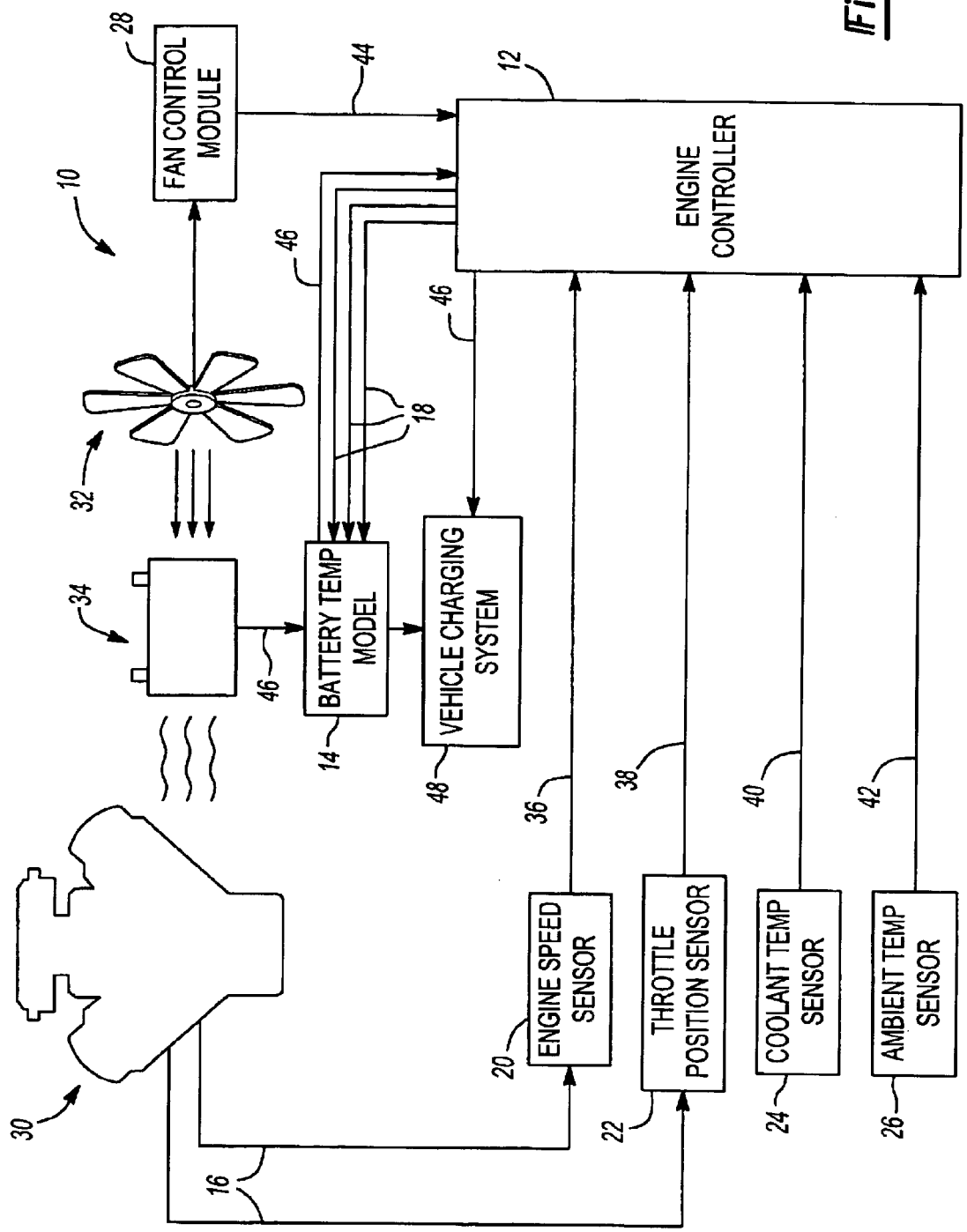
FIG. 1 is a functional block diagram of a vehicular battery temperature estimator according to the present invention.

A vehicular battery internal temperature estimator 10 includes an engine controller 12, a battery temperature model 14, a plurality of engine inputs 16, and a plurality of model inputs 18 as shown in FIG. 1. The engine controller 12 receives the engine inputs 16. The engine inputs 16 are provided by an engine speed sensor 20, a throttle position sensor 22, a coolant temperature sensor 24, an ambient temperature sensor 26, and a fan control module 28. A vehicle engine block 30 and a radiator fan 32 are located proximate a battery 34 in the vehicle. The engine speed sensor 20 provides an engine speed (RPM) signal 36 to the controller 12. The throttle position sensor 22 provides a throttle position signal 38 to the controller 12. The coolant temperature sensor 24 provides a coolant temperature signal 40 to the controller 12. The ambient temperature sensor 26 provides an ambient temperature signal 42 to the controller. The fan control module 28 provides a fan status signal 44 to the controller.

The engine block 30 is the primary heat source of the battery 34. Heat transfer between the engine block 30 and the battery 34 is a relatively slow integration process that affects the temperature of the battery 34. Additionally, airflow generated by vehicle movement and the radiator fan 32 affect the temperature 6 of the battery 34. The engine inputs 16 are indicative of the effects of the heat transfer from the engine block 30 and the airflow on the temperature of the battery 34. For example, the coolant temperature signal 40 is indicative of a temperature of the engine block 30. The ambient temperature signal 42 is used as a reference point for the coolant temperature signal 40. The throttle position signal 38 is used to determine a vehicle speed, which is indicative of airflow generated by vehicle movement. In the case of a mechanical radiator fan, the engine speed signal 36 is indicative of the speed of the radiator fan 32, and therefore is indicative of airflow generated by the radiator fan 32. The fan status signal 44 indicates whether the radiator fan 32 is on or off.

The controller 12 generates the model inputs 18 according to the engine inputs 16. The battery temperature model 14 estimates an internal temperature estimate 46 of the battery 34 according to the model inputs 18. The model inputs 18 include, but are not limited to, coolant temperature, ambient temperature, vehicle speed, engine speed, fan on/off status, and an engine off time. The battery temperature model 14 outputs the internal battery temperature estimate 46 to the controller 12, which communicates the internal battery temperature estimate 46 to a vehicle charging system 48. Alternatively, the battery temperature model 14 may output the internal battery temperature estimate 46 directly to the vehicle charging system 48. The vehicle charging system 48 operates according to the internal battery temperature estimate 46. In particular, the vehicle charging system 48 uses the internal battery temperature estimate 46 to determine an accurate set point for an electronic voltage regulator. An accurate set point is necessary to prevent the vehicle charging system 46 from overcharging or undercharging the battery 34. At high temperatures, overcharging of the battery 34 is possible. Conversely, undercharging the battery is possible at low temperatures.

The engine controller 12 updates a current predicted battery internal temperature according to the following equation:

$$T_b(n+1)=T_b(n)+\Delta T_b(n) \qquad \text{equation (1)}$$

where $T_b(n+1)$ is the current predicted battery internal temperature, $T_b(n)$ is a previous predicted battery internal temperature, $\Delta T_b(n)$ is a temperature increment, and n is a time increment. The temperature increment $\Delta T_b(n)$ is defined by the equation:

$$\Delta T_b(n+1)=k_d[T_b(n)-T_{amb}(n)]+f_i(n)[T_c(n)-T_{amb}(n)] \qquad \text{equation (2)}$$

where $T_{amb}(n)$ is the current ambient temperature and $T_c(n)$ is the current engine coolant temperature. The term $k_d[T_b(n)-T_{amb}(n)]$ in equation (2) represents heat dissipation of the battery. The heat dissipation in the battery is dependent upon the difference between the previous predicted battery temperature $T_b(n)$ and the current ambient temperature $T_{amb}(n)$, as well as the coefficient $k_d$. The term $f_i(n)[T_c(n)-T_{amb}(n)]$ in equation 2 represents the effect of the heat from the engine block. The effect of the heat from the engine block is dependent upon the difference between the current engine coolant temperature $T_c(n)$ and the current ambient temperature $T_{amb}(n)$, as well as the function $f_i(n)$.

The function $f_i(n)$ is the result of the integration of the transfer function $f_s(n)$ as demonstrated by:

$$f_i(n)=f_i(f_s(n),\tau) \qquad \text{equation (3)}$$

where $\tau$ is an integration constant and $f_s(n)$ is a combination of the vehicle speed $V_s(n)$, the on or off state of the radiator fan $V_f(n)$, and the engine speed $N(n)$. In other words, $f_s(n)$ is determined as follows:

$$f_s(n)=f_s(V_s(n),V_f(n)N(n)) \qquad \text{equation (4)}$$

Therefore, the battery internal temperature model can be written as:

$$T_b(n+1)=T_b(n)+k_d[T_b(n)-T_{amb}(n)]+f_i(f_s(V_s(n),V_f(n),N(n)),\tau)[T_c(n)-T_{amb}(n)] \qquad \text{equation (5)}$$

The coefficients of the above model can be determined based on vehicle idle and running data using a system identification method. Therefore, the above model can predict the new battery internal temperature $T_b(n+1)$ at each time increment n after engine ignition if an initial value $T_b(0)$ is given. However, the initial value $T_b(0)$ must be determined at engine startup. First, a coolant temperature estimation at engine startup $\hat{T}_c$ is determined according to the following model:

$$\hat{T}_c=g_c(T_{coff},T_{amboff})e^{-k_ct_{off}}+h_c(T_{amboff}) \qquad \text{equation (6)}$$

where $T_{coff}$ and $T_{amboff}$ are coolant and ambient temperatures, respectively, that were stored in non-volatile memories of the vehicle when the engine was last turned off, $k_c$ is a heat dissipation coefficient of the engine block, and $t_{off}$ is a time between the last time the engine was off and the time the engine was turned on again. After determining $\hat{T}_c$, the initial value $T_b(0)$ is estimated from:

$$T_b(0)=g_b(T_{boff},T_{coff},T_{amboff})e^{-k_bt_{off}}+h_b(\hat{T}_c,T_{amboff}) \qquad \text{equation (7)}$$

where $T_{boff}$ is an estimated battery internal temperature that was stored in nonvolable memory of the vehicle when the engine was last turned off and $k_b$ is a heat dissipation coefficient of the battery. Once the battery internal temperature initial value $T_b(0)$ is determined, the battery internal temperature $T_b(n+1)$ can be determined from equation (5).

Additionally, the model may determine the initial value if the vehicle is equipped with an engine block heater. If the vehicle is equipped with an engine block heater, the model is modified as follows:

$$\hat{T}_{cbh}=g_h(T_{coff},T_{amboff},C_h)e^{-k_ct_{off}}+h_h(T_{amboff},C_h) \qquad \text{equation (8)}$$

where $C_h$ is determined by effects of the engine block heater. The coolant temperature estimation that includes engine block heater effects, or $\hat{T}_{cbh}$, is compared to a measured coolant temperature at engine startup to determine if the vehicle used the engine block heater before the engine was started. This comparison is performed as follows:

$$|\hat{T}_{cbh}-T_c(0)|<|\hat{T}_c-T_c(0)| \qquad \text{equation (9)}$$

where $T_c(0)$ is the measured coolant temperature at engine startup. If the above inequality is true, then it is determined that the engine block heater was used and the battery internal temperature initial value $T_b(0)$ is determined from:

$$T_b(0)=g_{bh}(T_{boff},T_{coff},T_{amboff},C_h)e^{-k_bt_{off}}+h_{bh}(\hat{T}_{ch},T_{amboff},C_h) \qquad \text{equation (10)}$$

The coefficients in equations (6) through (10) may be determined from a systematic vehicle level test sequence. Additionally, it should be noted that the values $T_{boff}$, $T_{coff}$, and $T_{amboff}$ may be lost if the battery is disconnected. In this circumstance, the initial value $T_b(0)$ can not be determined from equations (6) through (10). Therefore, $T_b(0)$ may be assigned a default value. For example, $T_b(0)$ may be assigned the value of initial ambient temperature $T_{amb}(0)$.

Figure 2:
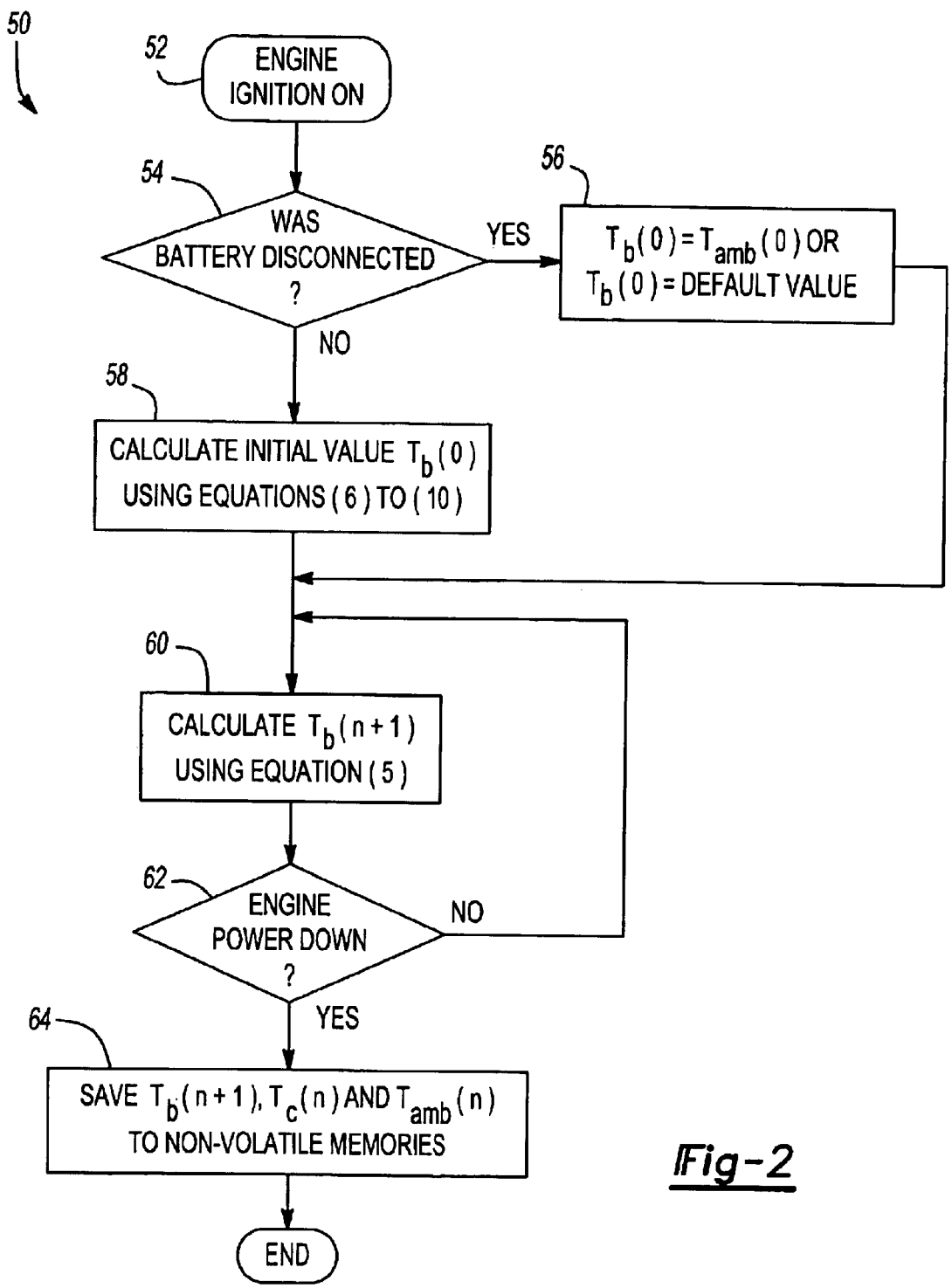
FIG. 2 is a flow diagram of a vehicular battery temperature estimation process according to the present invention.

A vehicular battery temperature estimation process 50 is shown in FIG. 2. The process 50 initiates upon engine startup at step 52. The process 50 determines if the battery was disconnected at step 54. If the battery was disconnected, the process 50 assigns a default value or $T_{amb}(0)$ to $T_b(0)$ at step 56. If the battery was not disconnected, the process 50 calculates the initial value $T_b(0)$ using equations (6) through (10) at step 58. The process 50 uses $T_b(0)$ and equation (5) to calculate $T_b(n+1)$ at step 60. At step 62, the process 50 determines whether the engine has been turned off. If the engine is still on, the process 50 continues to calculate $T_b(n+1)$ at step 60. If the engine is turned off, the process stores $T_b(n+1)$, $T_c(n)$, $T_{amb}(n)$ to non-volatile memories of the vehicle at step 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of determining an internal temperature estimate of a vehicle battery comprising:

estimating an initial internal temperature of the battery;

determining a heat source temperature that is indicative of a temperature of an engine block;

determining a transfer function of airflow;

determining an integration function of the transfer function of airflow and the heat source temperature; and updating a current internal temperature of the battery based on the integration function and the initial internal temperature.

2. The method of claim 1 wherein estimating the initial internal temperature includes estimating the initial internal temperature based in part on an engine off time.

3. The method of claim 2 wherein estimating the initial internal temperature further includes estimating the initial internal temperature based in part on heat dissipation of at least one of the battery and the engine block.

4. The method of claim 1 wherein determining the heat source temperature includes determining an engine coolant temperature and an ambient temperature.

5. The method of claim 4 further comprising determining a difference between the engine coolant temperature and the ambient temperature.

6. The method of claim 1 wherein determining the transfer function of airflow includes determining at least one of vehicle movement airflow and fan airflow.

7. The method of claim 1 wherein determining the fan airflow Includes determining the fan airflow according to at least one of a fan status signal and an engine speed.

8. The method of claim 7 wherein determining the transfer function of airflow includes determining the transfer function according to a vehicle speed, the fan status signal, and the engine speed.

9. The method of claim 1 wherein updating the current internal temperature includes updating the current internal temperature based on heat dissipation of the battery.

10. The method of claim 1 wherein estimating an initial internal temperature includes determining whether the battery was disconnected.

11. The method of claim 10 further comprising assigning a default value to the initial internal temperature if the battery was disconnected.

12. The method of claim 11 wherein the default value is an ambient temperature.

13. The method of claim 1 further comprising determining whether power to the engine is terminated.

14. The method of claim 13 further comprising storing at least one of the current internal temperature, the heat source temperature, and a current ambient temperature to a vehicle memory if the power to the engine is terminated.

* * * * *